(12) United States Patent
Altorf et al.

(10) Patent No.: US 10,427,172 B2
(45) Date of Patent: Oct. 1, 2019

(54) SEPARATION DEVICE COMPRISING A SWIRLER

(71) Applicant: SHELL OIL COMPANY, Houston, TX (US)

(72) Inventors: Hugo Altorf, Amsterdam (NL); Jannes Köppen, Amsterdam (NL); Joost Jacobus Kroon, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 14/365,316

(22) PCT Filed: Dec. 17, 2012

(86) PCT No.: PCT/EP2012/075718
§ 371 (c)(1),
(2) Date: Jun. 13, 2014

(87) PCT Pub. No.: WO2013/087919
PCT Pub. Date: Jun. 20, 2013

(65) Prior Publication Data
US 2015/0047305 A1 Feb. 19, 2015

(30) Foreign Application Priority Data
Dec. 16, 2011 (EP) .................................... 11194129

(51) Int. Cl.
*A47L 5/36* (2006.01)
*B04C 3/00* (2006.01)
(Continued)

(52) U.S. Cl.
CPC ............. *B04C 3/00* (2013.01); *B01D 45/08* (2013.01); *B01D 45/16* (2013.01); *B23K 26/40* (2013.01);
(Continued)

(58) Field of Classification Search
CPC ..... B04C 3/00; B04C 2003/006; B23K 26/40; B23K 26/4005; B23K 2203/50;
(Continued)

(56) References Cited

U.S. PATENT DOCUMENTS 3,049,085 A * 8/1962 Musat ................... F23D 1/00
431/183
3,448,563 A * 6/1969 Sobeck ................... B04C 3/04
210/512.2

(Continued)

FOREIGN PATENT DOCUMENTS

CH 238733 8/1945
CN 1171485 1/1998
(Continued)

*Primary Examiner* — Dung H Bui

(57) ABSTRACT

Separation device comprising a swirler of a sheet material comprising a plurality of vanes (4) with a flow entrance side edge (6) defining an entrance angle (α) and a flow exit side edge (8) defining an exit angle (β). The flow entrance side edge and flow exit side edge extend from a center section (3) to a peripheral edge (9), which extends between end points of the flow entrance edge and the flow exit edge. The entrance angle is larger than the exit angle.

8 Claims, 5 Drawing Sheets

Figure 1A:
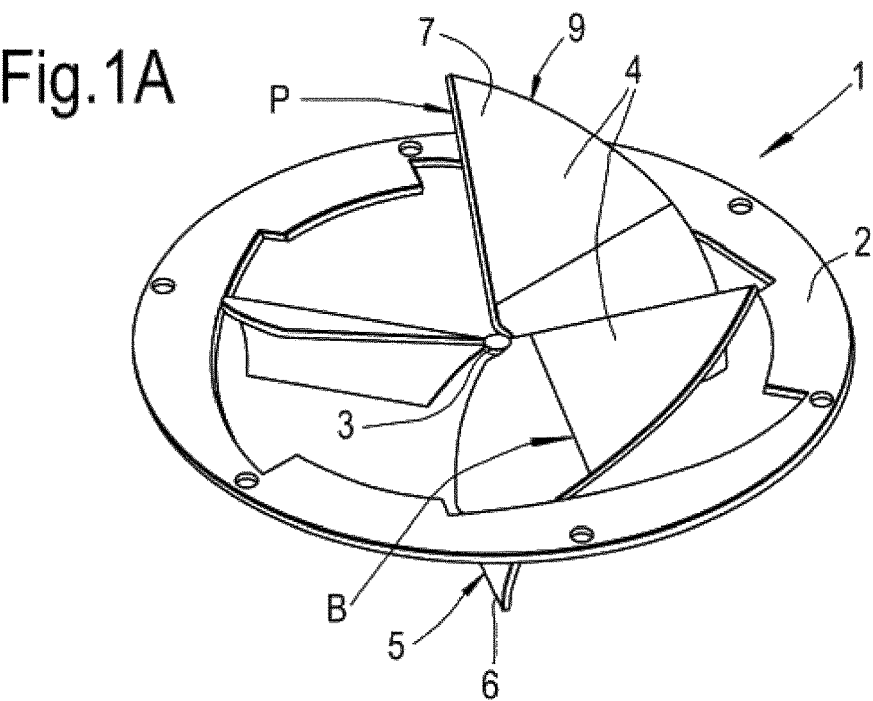

(51) Int. Cl.
  *B01D 45/16* (2006.01)
  *B01D 45/08* (2006.01)
  *F23C 7/00* (2006.01)
  *B23P 15/02* (2006.01)
  *B23K 26/40* (2014.01)
  *B01D 50/00* (2006.01)
  *A47L 9/16* (2006.01)
  *B23K 103/00* (2006.01)

(52) U.S. Cl.
  CPC .............. *B23P 15/02* (2013.01); *F23C 7/004* (2013.01); *A47L 9/1608* (2013.01); *B01D 50/002* (2013.01); *B04C 2003/006* (2013.01); *B23K 2103/50* (2018.08); *Y10T 29/49245* (2015.01)

(58) Field of Classification Search
  CPC .... B23P 15/02; F23C 7/004; Y10T 29/49245; B01D 45/08; B01D 45/16; B01D 50/002; B01D 45/12; A47L 9/1608
  See application file for complete search history.

(56) References Cited

U.S. PATENT DOCUMENTS

| | | | | |
|---|---|---|---|---|
| 3,885,935 A * | 5/1975 | Nutter | ............... | B01D 45/12 55/424 |
| 4,130,389 A * | 12/1978 | Kaburagi | ............ | F23D 14/24 431/183 |
| 4,311,494 A * | 1/1982 | Conner | ............. | B01D 45/16 55/394 |
| 4,361,490 A * | 11/1982 | Saget | ................ | B04B 5/12 209/210 |
| 4,629,481 A * | 12/1986 | Echols | ............. | B01D 45/16 122/34 |
| 5,161,946 A * | 11/1992 | Bortz | ................ | F01D 9/02 415/183 |
| 5,186,607 A * | 2/1993 | Yang | ................ | F01D 9/02 415/183 |
| 5,407,347 A | 4/1995 | Bortz | | |
| 5,510,017 A | 4/1996 | Abdullayev | | |
| 6,110,246 A * | 8/2000 | Eubank | ............. | B01D 45/14 55/394 |
| 6,280,493 B1 * | 8/2001 | Eubank | ............. | B01D 45/14 55/398 |
| 6,386,863 B1 | 5/2002 | Sarv et al. | | |
| 7,070,637 B1 * | 7/2006 | Zhang | ............... | B01D 45/12 55/347 |
| 7,258,713 B2 * | 8/2007 | Eubank | ............. | F02M 35/022 55/401 |
| 7,841,585 B2 | 11/2010 | Konijn | | |
| 8,043,394 B2 * | 10/2011 | Mital | ................ | B01F 3/04049 422/177 |
| 8,945,283 B1 * | 2/2015 | Krishnamurthy | ........ | B04C 3/04 55/347 |
| 9,192,886 B2 * | 11/2015 | Nieuwoudt | ......... | B01D 50/002 |
| 9,228,542 B2 * | 1/2016 | Anderson | ....... | F02M 35/10262 |
| 2004/0195706 A1 * | 10/2004 | Konijn | ............. | B01D 3/20 261/79.2 |
| 2008/0110140 A1 * | 5/2008 | Egger | ............... | B01D 45/08 55/337 |
| 2009/0007530 A1 * | 1/2009 | Kondo | ............... | F22B 37/327 55/457 |
| 2009/0050105 A1 * | 2/2009 | Shibata | ............. | B01D 45/16 123/306 |
| 2009/0139938 A1 * | 6/2009 | Larnholm | ........... | B04C 3/00 210/788 |
| 2010/0072121 A1 * | 3/2010 | Maier | ................ | B01D 45/16 210/196 |
| 2012/0117928 A1 * | 5/2012 | Kondo | ............... | B01D 45/14 55/442 |
| 2012/0134832 A1 * | 5/2012 | Wu | .................... | A61M 1/101 416/198 R |
| 2014/0007770 A1 * | 1/2014 | Gaebler | ............. | B01D 45/08 95/272 |
| 2014/0013764 A1 * | 1/2014 | Biagioli | ............. | F23R 3/14 60/748 |
| 2014/0124224 A1 * | 5/2014 | Berghuijs | ........... | A62C 3/14 169/70 |
| 2014/0138306 A1 * | 5/2014 | Wu | .................... | B04C 3/06 210/512.1 |
| 2014/0299540 A1 * | 10/2014 | Ackermann | ........ | B04C 3/06 210/512.3 |
| 2015/0157972 A1 * | 6/2015 | Bratten | ............. | B01D 45/12 95/22 |

FOREIGN PATENT DOCUMENTS

| | | |
|---|---|---|
| CN | 101229462 | 7/2008 |
| CN | 102027216 | 4/2011 |
| CN | 101473115 | 12/2012 |
| EP | 0777084 | 6/1997 |
| GB | 2204674 | 11/1988 |

* cited by examiner

SEPARATION DEVICE COMPRISING A SWIRLER

PRIORITY CLAIM

The present application is the National Stage (§ 371) of International Application No. PCT/EP2012/075718, filed Dec. 17, 2012, which claims priority from European application no. 11194129.0, filed Dec. 16, 2011, the disclosures of which are incorporated herein by reference.

The present invention pertains to a separation device comprising a swirler cut from a sheet material and comprising a plurality of vanes.

Swirlers can be used for separation in separation devices in which they generate centrifugal vortices in a flow of a fluid, such as a gas or a liquid optionally further containing solid particles. Most often, swirlers are used for separating liquid components from a gas.

In low cost applications, swirlers can be cut from a sheet material, such as sheet metal or blank. Starting from the metal blank, the swirler can be cut out, e.g., by laser cutting, with radial cutting lines separating adjacent vanes and a circular peripheral cutting line with a radius corresponding to the radius of the channel in which the swirler is to be placed.

In practice, such swirlers cause relatively much friction, and consequently more pressure drop and loss of energy. Moreover, the swirling efficiency is less than with other types of swirlers.

If the flat vanes are bent away from the plane of the original sheet metal, in plan view the bent vanes cannot cover the full through flow area and gaps are created between the vanes and between the vanes and the inner wall of the channel where the swirler is located. Consequently, part of the gas can flow right through the swirler without being impacted directly by the swirler.

It is an object of the invention to provide a low cost swirler with improved efficiency for separating fluids, more specifically separating liquid from a mixture of gas and liquid. It is a further object to provide a swirler with less pressure drop.

The object of the invention is achieved with a swirler of a sheet material comprising a plurality of vanes with a flow entrance side edge defining an entrance angle and a flow exit side edge defining an exit angle. The flow entrance side edge and flow exit side edge extend from a center section to a peripheral edge. The peripheral edge extends between end points of the flow entrance edge and the flow exit edge. The vanes are bent in such a way that the entrance angle is larger than the exit angle.

In this context, the entrance angle is the angle between the entrance section of the vane and the plane of the blank forming the swirler, viewed in side view. Correspondingly, the exit angle is the angle between the exit section of the vane and the plane of the blank forming the swirler, viewed in side view. If the entrance angle is larger than about 70 degrees, e.g., larger than 80 degrees, e.g., about 90 degrees, it substantially coincides with the average flow direction of a gas flow entering the swirler. This way, the gas flow is gradually guided towards the exit section. It has been found that this results in substantially less pressure drop. Suitable exit angles are for instance within the range of 30-60 degrees, preferably 40-50 degrees, which generally results in high swirling efficiency, although other exit angles can also be used depending on the application.

Formation of a gap between the peripheral edge and the channel wall can effectively be prevented if the peripheral edge of the bent vanes is made circular in plan view. This can be achieved by cutting the vanes in such a way that the exit edges are larger than the entrance side edges. Larger exit angles require larger differences in length between the entrance and exit side edges.

In a further embodiment, the swirler may be made of two or more stacked sheet metal subswirlers. The vanes of one subswirler can be entangled between the vanes of the other subswirler. This may double or triple the number of vanes, which has the advantage that in plan view the swirler is fully closed and no gas can pass the swirler without being impacted. Preferably, the subwirlers present in the swirler are identical.

The sub-swirlers can for instance comprise 2, 3 or 4 vanes. The stacked swirlers can be stacked in such way that the vanes are at equal distance of each other, although other vane spacings can also be used, if so desired.

Optionally, the flow entrance edges can be truncated to be substantially perpendicular to the flow direction. This way, the swirlers can be made with a lesser height.

The disclosed swirlers can be manufactured in a low cost manner by providing cutting lines in a metal blank to define the peripheral edges, the flow entrance edges and flow exit edges of a plurality of vanes of a swirler. The vanes are subsequently bent to define an exit angle and an entrance angle, which is larger than the exit angle.

The blank can be a sheet metal, such as steel. Cutting can be done by laser cutting or any other suitable cutting technique.

The cutting line for the peripheral edge may extend between the end point of a first radial cutting line and a point on a next radial cutting line at a distance form the end point of the second cutting line. This way, the exit side edge can be made larger than the entrance side edge and the vanes can be bent in such a way that the peripheral edge can join the channel wall without leaving a substantial gap.

The cutting line for the peripheral edge may be interrupted, e.g. at one of its end points or in between the end points, to create a material bridge between the vanes and a remaining part of the blank, which can for example be shaped as a peripheral ring.

A stacked swirler of the type disclosed above can be made by stacking the cut swirler with the bent vanes with one or more correspondingly cut and bent swirlers to form a single stacked swirler.

Figure 1B:
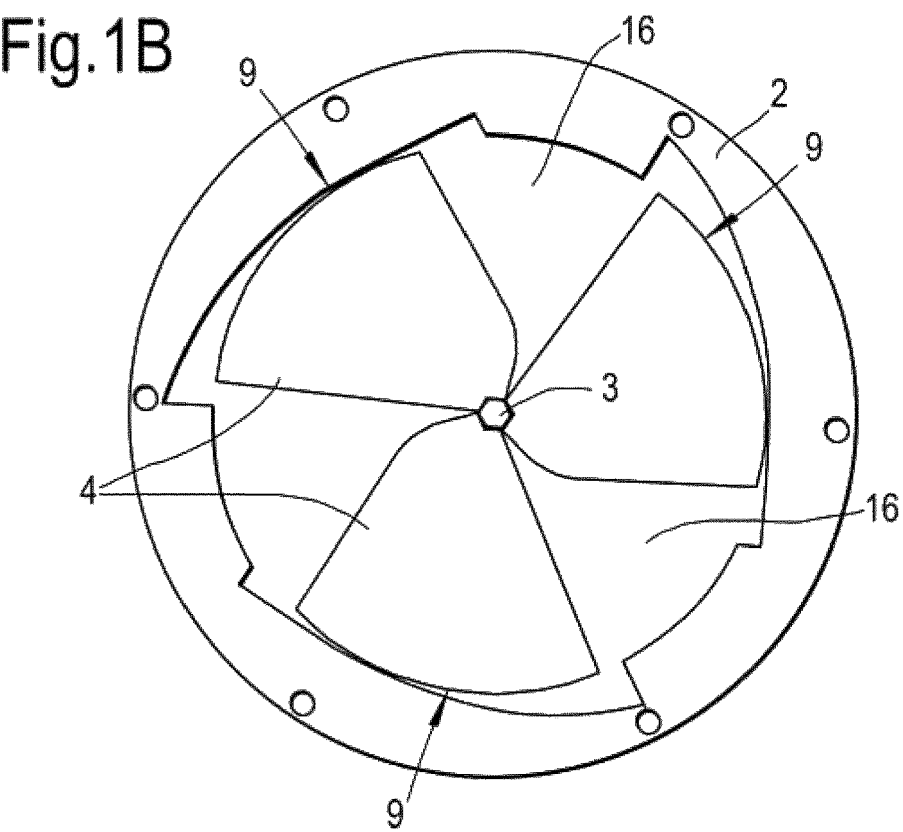
Figure 1C:
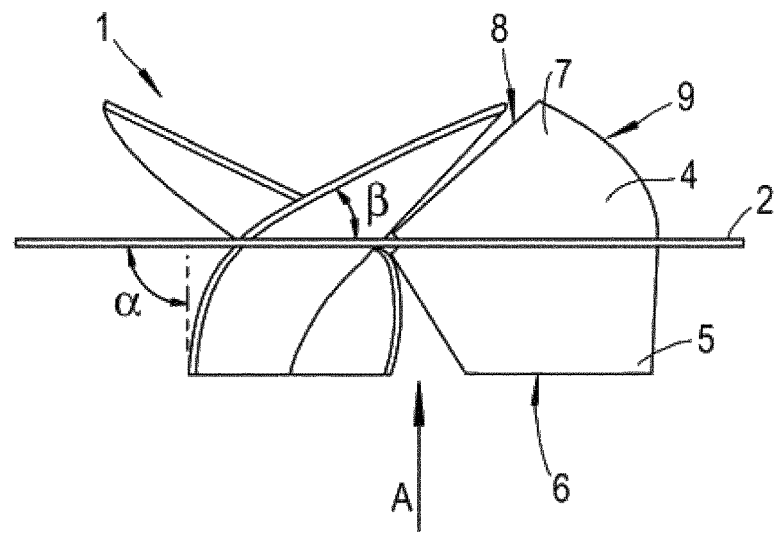
Figure 1D:
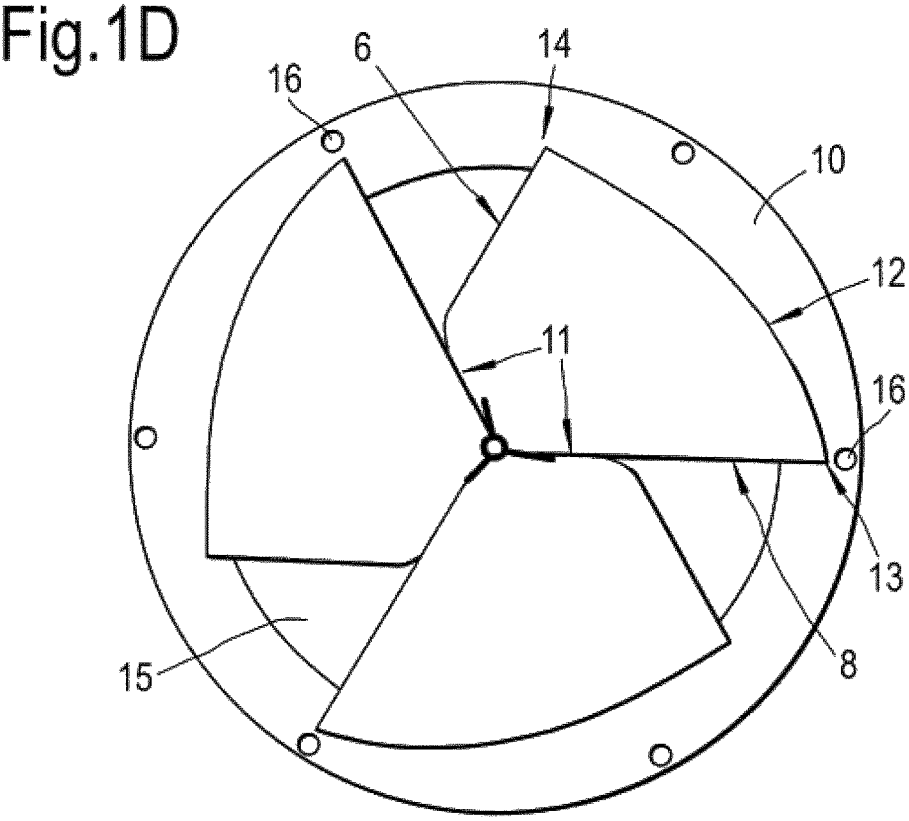
Figure 2A:
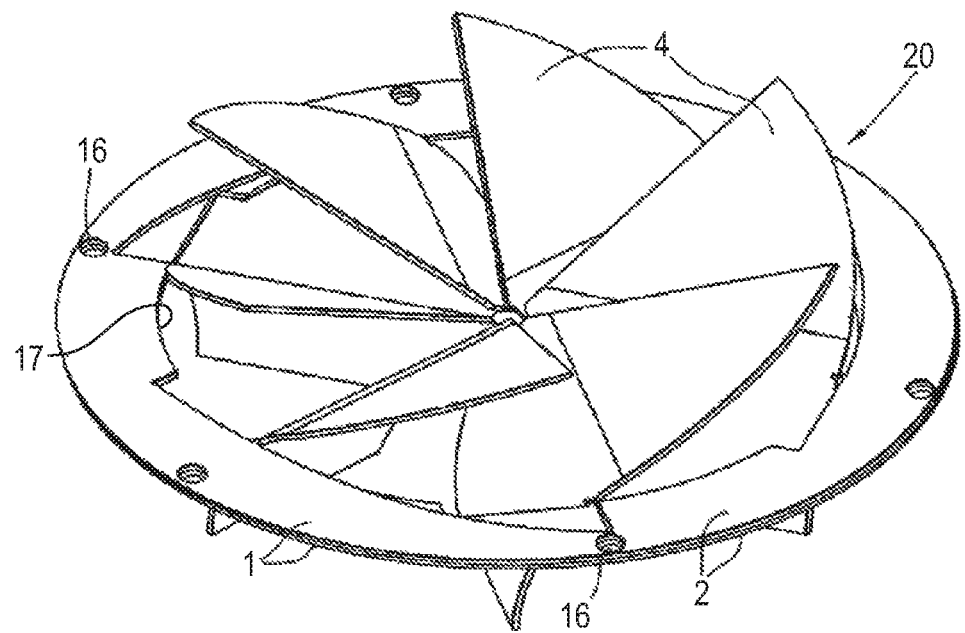
Figure 2B:
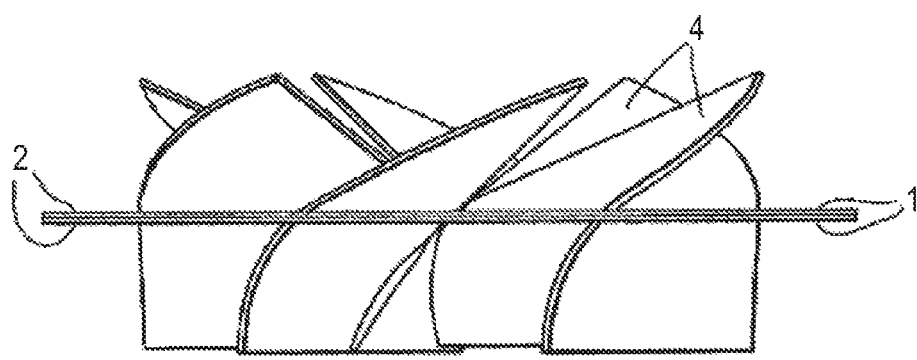
Figure 2C:
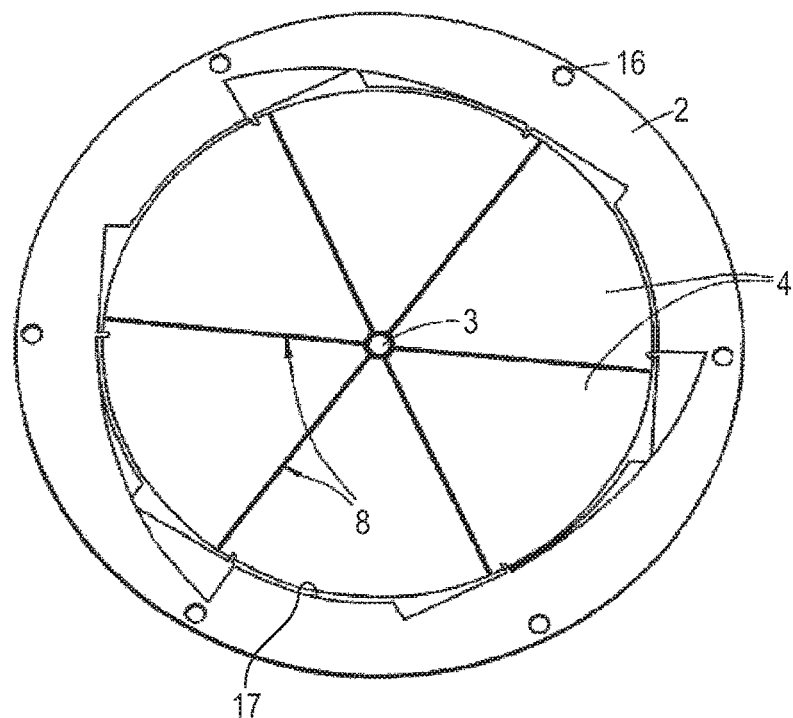
Figure 2D:
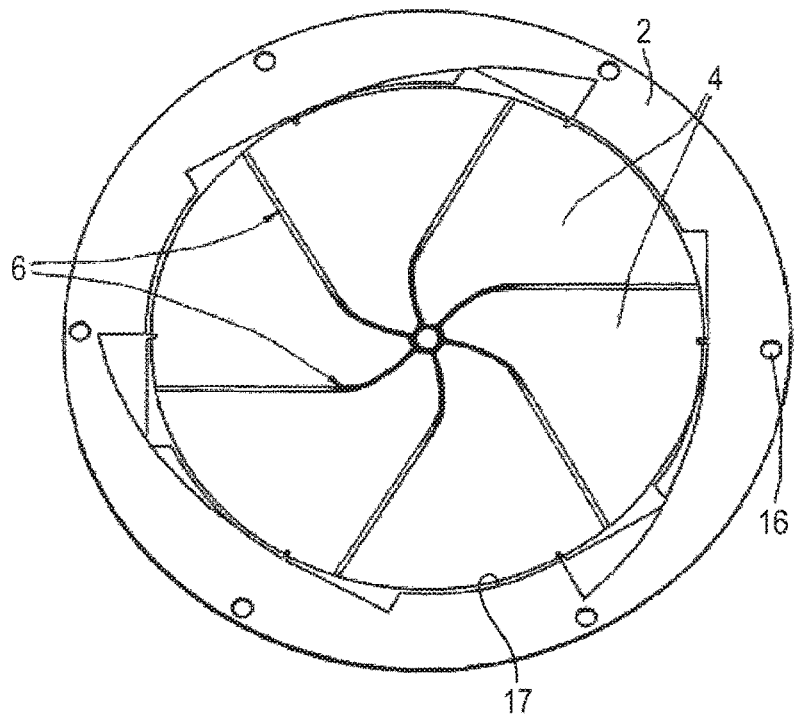
Figure 3:
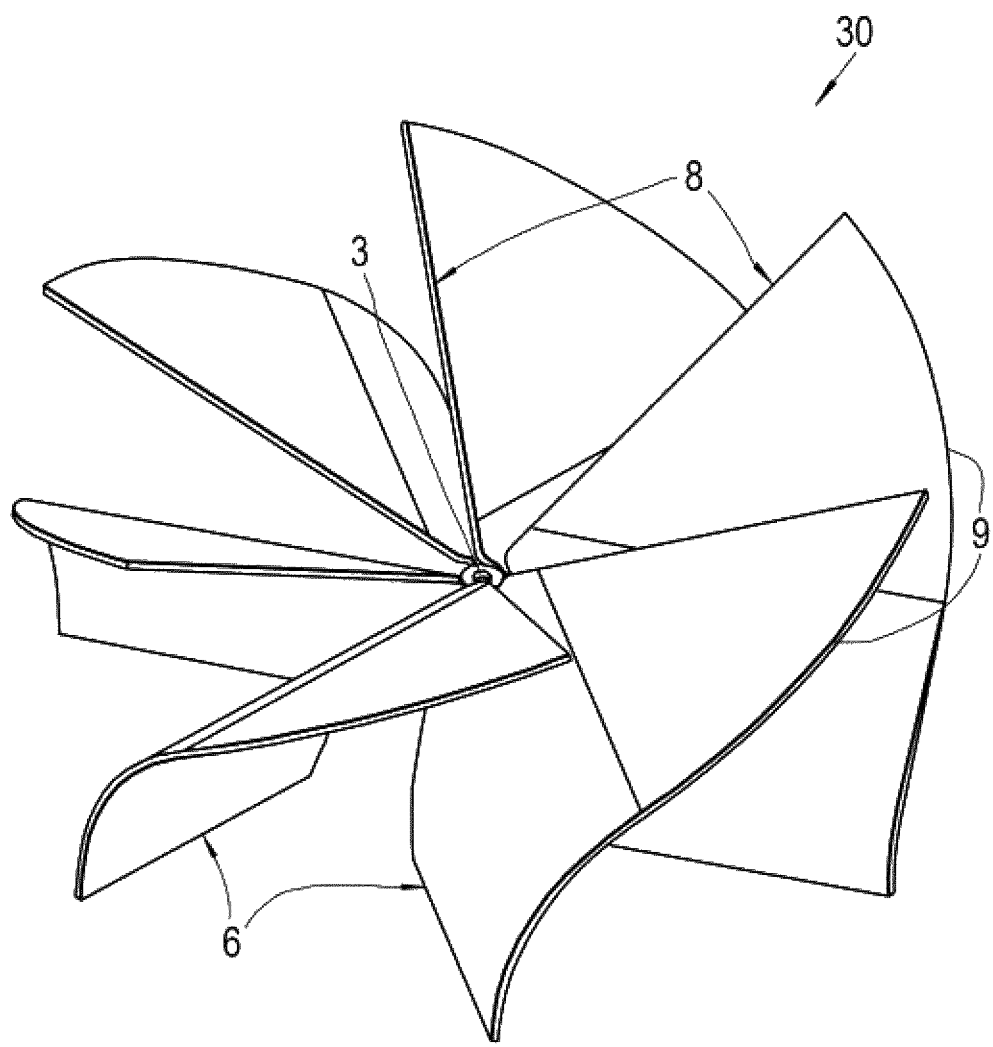

Exemplary embodiments will now be described by reference to the accompanying drawings, in which:

FIG. 1A: shows in perspective view an exemplary embodiment of a swirler;
FIG. 1B: shows the swirler of FIG. 1A in plan view;
FIG. 1C: shows the swirler of FIG. 1A in side view;
FIG. 1D: shows in plan view a blank for the swirler of FIG. 1A;
FIG. 2A: shows in perspective view a second exemplary embodiment of a swirler;
FIG. 2B: shows the swirler of FIG. 2A in side view;
FIG. 2C: shows in plan view the flow exit side of the swirler of FIG. 2A;
FIG. 2D: shows in plan view the flow entrance side of the swirler of FIG. 2A;
FIG. 3: shows a third exemplary embodiment of a swirler.

FIGS. 1A-C show an exemplary embodiment of a sheet metal swirler 1 comprising a peripheral ring 2, a central section 3 and three radially and equidistantly arranged vanes 4 bridging the central section 3 and the peripheral ring 2. The vanes 4 are of the same size and shape. The vanes 4 have a flow entrance section 5 at a flow entrance side edge 6 and a flow exit section 7 at a flow exit side edge 8.

As shown in FIG. 1C the flow entrance section 5 defines an entrance angle α of about 90 degrees with the plane through the ring 2 and the central section 3, which forms the plane of the original sheet metal blank. The flow exit section 7 defines an exit angle β of about 40 degrees. The flow entrance side edges 6 are truncated to be substantially perpendicular to the flow direction, indicated by arrow A in FIG. 1C.

In the shown embodiment, the flow entrance section 5 of the vanes 4 gradually bends from a 90 degrees entrance angle to the 40 degrees exit angle, which is reached at a point indicated in FIG. 1A by imaginary line B. In alternative embodiments, the line B can be positioned at a higher or lower level. The curved section of the vane 4 can for example be curved with a constant radius or a radius which gradually increases or decreases from the entrance edge towards line B. The flow exit section 7 is flat with a constant angle of about 40 degrees. In alternative embodiments, the flow entrance section 5 may also have a flat section near the flow entrance edge and/or the flow exit section 7 may also be curved to arrive gradually at the desired exit angle at the flow exit edge 8.

As shown in FIG. 1B the vanes 4 have peripheral edges 9 jointly defining a circular outline in plan view. This way, the peripheral edges 9 join the channel wall (not shown) without leaving a substantial gap.

FIG. 1D shows a sheet metal blank 10 for making a swirler 1 after the cutting lines have been applied. Radial cutting lines 11 are cut to define at least partly the flow entrance edges 6 and flow exit edges 8 of the vanes 4. The radial cutting lines 11 are bridged by cutting lines 12 defining the peripheral edges 9 of the vanes 4. The cutting lines 12 are shaped in such a way that the peripheral edges 9 follow a circular contour in plan view after the vanes 4 are bent in their final shape. To this end, the end point 13 of the cutting line 12 at the side of the exit edge 8 is at a larger radial distance from the central section 3 than the end point 14 of the cutting line 12 at the entrance edge 6.

To truncate the flow entrance edges 6, triangular sections 15 are cut out. The vanes 4 are subsequently bent into their final shape. Optionally, the peripheral ring 2 can be removed or it can be maintained for providing a support for fastening means or the like.

As shown in FIG. 1B, gaps 16 are left open between the vanes 4. As a result, part of the gas can flow through the vanes 4 without being swirled. To enhance swirling efficiency two identical swirlers 1 can be stacked as subswirlers to form a single swirler 20 as shown in FIGS. 2A-D. The subswirlers 1 are stacked with entangling equally spaced vanes 4 and with the rings 2 attached to each other. The rings 2 are provided with openings 17. The openings 17 of the lower subswirler 1 are in line with the openings 17 of the upper subswirler 1 when the vanes 4 are positioned at equal distances.

FIGS. 2C and D show the swirler 20 in plan view from a downstream point and an upstream point respectively. FIG. 2C shows the straight flow exit edges 6, while FIG. 2D shows the truncated flow entrance edges 6. The vanes 4 cover the full circular flow area. Any gas passing the swirler 20 will be impacted by the vanes 4 and be swirled. The gas flow can be swirled in a clockwise or counterclockwise direction, depending on the direction of the vanes 4.

The rings 2 can be used for fastening the swirler 20, for instance at the end of a conduit or between two conduits, in such a way that the vanes 4 are within the channel defined by the conduit, while the rings 2 do not cross the flow path of the channel.

If the swirler is to be positioned within a channel at a distance from the channels' end a swirler can be used which does not have any peripheral ring 2. FIG. 3 shows a further embodiment of such a ringless swirler 30 which is similar to the swirler 20 of FIGS. 2A-C, with the difference that the rings 2 are removed. The swirler 30 is made of two stacked ringless subswirlers.

The center section 3 can be kept small relative to the vanes 4 or it can be made larger. Larger center sections 3 typically result in more pressure drop. In the shown embodiments, the center sections 3 are positioned between the flow exit sections 7 and the flow entrance sections 5 of the vanes 4. Optionally, the center section can be used to connect two or more subswirlers with each other, e.g., by a bolt connection.

That which is claimed is:

1. A separation device, comprising: a swirler cut from a sheet metal blank and comprising at least two stacked sheet metal subswirlers, wherein the at least two stacked sheet metal subswirlers comprises a planar peripheral ring defined by cutting the sheet metal blank, wherein each of the at least two stacked sheet metal subswirlers comprise 2-4 vanes with a flow entrance side edges defining an entrance angle (α) that is at least 70 degrees and flow exit side edges defining an exit angle (β) that is within a range of 20-60 degrees, wherein the flow entrance side edges and flow exit side edges extend from a center section of the swirler to a peripheral edge of the swirler, and wherein the peripheral edge is circular in plan view and extends between end points of the flow entrance side edges and the flow exit side edges, wherein the entrance angle is larger than the exit angle; wherein the flow entrance side edges are truncated to be substantially perpendicular to the flow direction of fluid through the swirler; and wherein the vanes bridge the center section and the planar peripheral ring.

2. A separation device according to claim 1 wherein the entrance angle (α) is at least 80 degrees.

3. A separation device according to claim 1 wherein the exit angle (β) is within a range of 30-60 degrees.

4. A separation device according to claim 1 wherein the subswirlers are positioned relative to each other such that the vanes are at equal distance of each other.

5. A swirler for use in separation devices, wherein the swirler comprises:
at least two subswirlers positioned in a stacked relationship, wherein each subswirler comprises a planar sheet metal black, wherein each subswirler has a top surface and bottom surface and cut to define 2-4 vanes with each vane having a peripheral edge that is circular in plan view, wherein each subswirler has a flow entrance section comprising flow entrance edges and a flow exit section having flow exit edges, and cut to define a planar peripheral ring in the planar sheet metal blank;
wherein both the flow entrance edges and the flow exit edges extend radially from a center section of the swirler to the planar peripheral ring;
wherein each of the vanes are bent to provide a bent vane providing an entrance angle (α) below the bottom surface and between the flow entrance section and the plane of the planar sheet metal blank, wherein the entrance angle (α) is at least 70 degrees, and providing an exit angle (β) above the top surface between the flow exit section and the plane of the planar sheet metal blank, wherein the exit angle (β) is within a range of 20-60 degrees;

wherein fluid flow direction through the swirler is from the bottom surface to the top surface;

wherein the entrance angle (α) is larger than the exit angle (β);

wherein the flow entrance edges are truncated to be substantially perpendicular to the fluid flow direction through the swirler; and wherein each of the vanes are bridged from the center section to the planar peripheral ring.

6. A swirler according to claim 5, wherein the entrance angle (α) is at least 80 degrees.

7. A swirler according to claim 6, wherein the exit angle (β) is within a range of 30-60 degrees.

8. A swirler according to claim 5, wherein the at least two subswirlers are positioned relative to each other such that the vanes are at equal distance of each other.

\* \* \* \* \*